US008810836B2

(12) United States Patent
Mizoguchi et al.

(10) Patent No.: US 8,810,836 B2
(45) Date of Patent: Aug. 19, 2014

(54) PRINTING SERVER, PRINTING SYSTEM, AND PRINTING METHOD FOR CREATING IMAGE DATA REPRESENTING AN IMAGE BASED ON PRINT DATA AND AN ADDITIONAL IMAGE TO BE ADDED TO THE IMAGE

(75) Inventors: Yoshihiro Mizoguchi, Osaka (JP); Shinichiro Ohashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 212 days.

(21) Appl. No.: 13/227,176

(22) Filed: Sep. 7, 2011

(65) Prior Publication Data
US 2012/0057204 A1   Mar. 8, 2012

(30) Foreign Application Priority Data

Sep. 8, 2010   (JP) .................................. 2010-201250

(51) Int. Cl.
*G06F 3/12*   (2006.01)
(52) U.S. Cl.
USPC ........................................................ 358/1.15
(58) Field of Classification Search
None
See application file for complete search history.

(56) References Cited

U.S. PATENT DOCUMENTS

| 2004/0133465 A1* | 7/2004 | Koge et al. ............... 705/14 |
| 2011/0302490 A1 | 12/2011 | Koarai |
| 2012/0011435 A1 | 1/2012 | Koarai et al. |
| 2012/0036432 A1 | 2/2012 | Mizoguchi |

FOREIGN PATENT DOCUMENTS

| JP | 2001-13822 A | 1/2001 |
| JP | 2002-215783 A | 8/2002 |
| JP | 2002-268831 A | 9/2002 |
| JP | 2003-48363 A | 2/2003 |
| JP | 2004-70601 A | 3/2004 |
| JP | 2004-199475 A | 7/2004 |
| JP | 2006-268759 A | 10/2006 |
| JP | 2007-266884 A | 10/2007 |
| JP | 2008-254387 A | 10/2008 |
| JP | 2010-191654 A | 9/2010 |
| JP | 2011-257871 A | 12/2011 |
| JP | 2012-18631 A | 1/2012 |
| JP | 2012-37933 A | 2/2012 |
| WO | WO 02/21362 A1 | 3/2002 |

\* cited by examiner

*Primary Examiner* — Jeremiah Bryar
(74) *Attorney, Agent, or Firm* — Birch, Stewart, Kolasch & Birch, LLP

(57) ABSTRACT

When print data transmitted by a PC is accumulated in a printing server, the printing server creates display data for displaying on the PC an image based on the print data and an image corresponding to an advertisement image to be added to the image, and transmits the display data to the PC. When print data is created so that an image is printed on only the front side of a recording paper, image data is created so that an advertisement image is printed on the reverse side of the recording paper. The PC previews an image on the surface and an image on the reverse side based on the received display data on an LCD of a display section.

16 Claims, 11 Drawing Sheets

F I G. 1
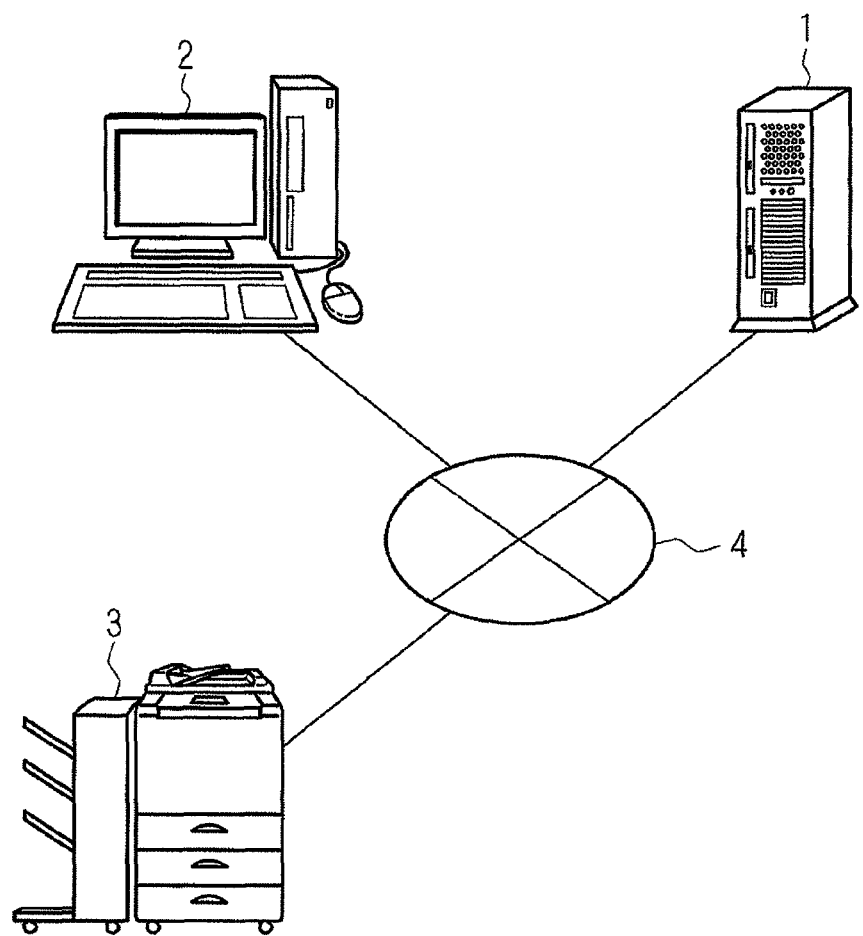

F I G. 3
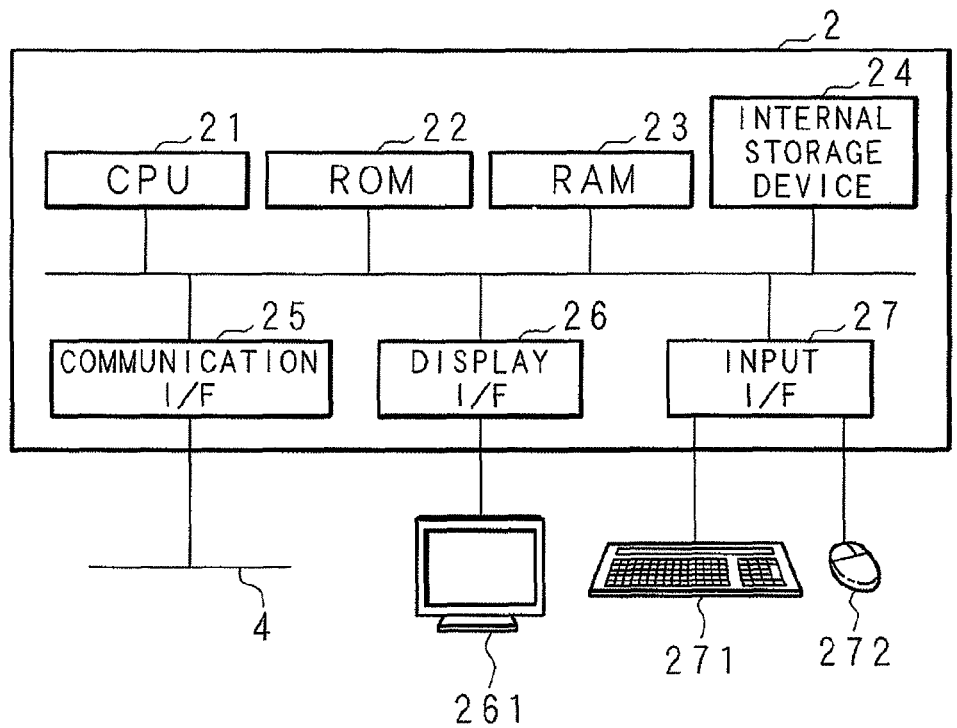

PRINTING SERVER, PRINTING SYSTEM, AND PRINTING METHOD FOR CREATING IMAGE DATA REPRESENTING AN IMAGE BASED ON PRINT DATA AND AN ADDITIONAL IMAGE TO BE ADDED TO THE IMAGE

CROSS-REFERENCE TO RELATED APPLICATIONS

This Nonprovisional application claims priority under 35 U.S.C. §119(a) on Patent Application No. 2010-201250 filed in Japan on Sep. 8, 2010, the entire contents of which are hereby incorporated by reference.

BACKGROUND OF THE INVENTION

1. Field of the Invention

The present invention relates to a printing server, a printing system provided with the printing server, and a printing method for creating image data representing an image based on print data and an additional image to be added to the image.

2. Description of Related Art

In recent years, a kind of POD (Print On Demand) service is provided, and in the POD service, printed matter can be received at an setting location of a printer, such as a convenience store by registering a document created on a personal computer via the Internet onto a specific window. In this kind of service, a discount of a print fee is proposed by adding an advertisement image on the reverse side of printed matter and printing the printed matter.

For example, Japanese Patent Application Laid-Open No. 2007-266884 discloses a copying machine that forms an image of which print is required from a user on the front side of a sheet material (recording paper), and records on the reverse side thereof information, such as an advertisement, news, etc., received from a server. Moreover, Japanese Patent Application Laid-Open No. 2002-268831 discloses an advertisement printing system in which a printer on a network acquires print data from a computer and prints the print data on the front side of a recording paper, while acquiring advertisement data from a server and printing the advertisement data on the reverse side thereof.

Furthermore, Japanese Patent Application Laid-Open No. 2004-70601 discloses an advertisement printing system in which a host apparatus (a terminal apparatus or an information processing apparatus) connected with an advertisement managing apparatus via the Internet adds advertisement information provided from the advertisement managing apparatus to image information to create print data, and prints the print data using a printing apparatus directly connected with the host apparatus or performs print control of the printing apparatus. Especially, Japanese Patent Application Laid-Open No. 2004-70601 discloses previewing for print from a setting screen to be displayed when print is selected by the host apparatus.

SUMMARY OF THE INVENTION

However, in the techniques disclosed in Japanese Patent Application Laid-Open No. 2007-266884 or Japanese Patent Application Laid-Open No. 2002-268831, the copying machine or the printer needs to acquire data of an advertisement etc. from the server in addition to print data to be printed on the front side of a recording paper, and print the data on the reverse side of the recording paper. Moreover, in the technique disclosed in Japanese Patent Application Laid-Open No. 2004-70601, although a standard printing apparatus is available, it is necessary to add advertisement information to print data by the host apparatus which requires print, it is not considered that an advertisement is printed on the reverse side of printed matter, and there is a possibility that an image of which print is required and an advertisement image may be overlapped with each other.

Furthermore, in the techniques disclosed in Japanese Patent Application Laid-Open No. 2004-70601, Japanese Patent Application Laid-Open No. 2002-268831 and Japanese Patent Application Laid-Open No. 2007-266884, since the whole image on the reverse side of printed matter cannot be previewed at the time of a request of print even if an advertisement is printed on the reverse side, it is hard to grasp an image of actual printed matter, and thereby, it is difficult to identify whether or not the printed matter, which is to be previewed, has an advertisement.

The present invention has been made with the aim of solving the above problems, and it is an object of the invention to provide a printing server, a printing system and a printing method that can create image data in which other image is added to one image to be printed on one side of a recording paper without overlapping with each other, and preview the whole print image.

The printing server according to the present invention is a printing server which accumulates print data and creates image data representing an image based on the accumulated print data and an additional image to be added to the image, comprising: a creating section for creating display data for displaying an image corresponding to the additional image together with an image based on the print data on other apparatus, when print data is accumulated; a transmitting section for transmitting display data created by the creating section to the other apparatus; and a determining section for determining whether or not an image based on the print data is formed on only one side of a recording paper, wherein when the determining section determines that the image is formed on only one side of a recording paper, image data is created so that the additional image is formed on the other side of the recording paper.

The printing server according to the present invention is characterized in that the image corresponding to the additional image is different from said additional image.

The printing server according to the present invention is characterized in that the additional image varies with date and time at which an image based on the image data should be formed.

The printing server according to the present invention is characterized by further comprising a specifying section for specifying a location at which an apparatus which should form an image based on the print data is provided, wherein the additional image varies with a location specified by the specifying section.

The printing system according to the present invention is a printing system, comprising: the above-described printing server; and an image forming apparatus which is connected to the printing server so as to communicate with each other, receives image data created by the printing server, and forms an image based on the image data, wherein the printing server transmits the created image data to the image forming apparatus.

The printing system according to the present invention is a printing system, comprising: the above-described printing server; an electrical apparatus which is connected to the printing server so as to communicate with each other, transmits print data to the printing server, receives display data created by the printing server, and displays an image based on the display data; and an image forming apparatus which is connected to the printing server so as to communicate with each other, receives image data created by the printing server, and forms an image based on the image data, wherein the printing server receives print data from the electrical apparatus and accumulates the print data.

The printing system according to the present invention is a printing system comprising: a printing server which receives print data, accumulates the print data, creates image data representing an image based on the accumulated print data and an additional image to be added to the image, and transmits the image data; an electrical apparatus which is connected to the printing server so as to communicate with the printing server, and transmits print data to the printing server; and an image forming apparatus which is connected to the printing server so as to communicate with the printing server, receives image data from the printing server, and forms an image based on the image data, the printing system further comprising: a creating section for creating display data for displaying an image corresponding to the additional image together with an image based on the print data; and a display section for displaying an image based on display data created by the creating section, wherein the printing server is provided with a determining section for determining whether or not an image based on the print data is formed on only one side of a recording paper, and when the determining section determines that it is formed on only one side of a recording paper, image data is created so that the additional image is formed on the other side of the recording paper.

The printing system according to the present invention is characterized in that the printing server transmits information representing an image corresponding to the additional image, when the electrical apparatus transmits the print data to the printing server, the creating section receives the information from the printing server, and creates the display data, and the electrical apparatus is provided with the display section.

The printing system according to the present invention is characterized in that the printing server transmits information representing an image corresponding to the additional image, before the image forming apparatus forms an image based on the image data, the creating section receives the information and print data from the printing server, and creates the display data, and the image forming apparatus is provided with the display section.

The printing system according to the present invention is characterized in that the image corresponding to the additional image is different from the additional image.

The printing system according to the present invention is characterized in that the additional image varies with date and time at which an image based on the image data should be formed.

The printing system according to the present invention is characterized in that the printing server is provided with a specifying section for specifying a location at which an apparatus which should form an image based on the print data is provided, and the additional image varies with a location specified by the specifying section.

The printing method according to the present invention is a printing method for obtaining printed matter using a system comprising: a printing server which receives print data, accumulates the print data, creates image data representing an image based on the accumulated print data and an additional image to be added to the image, and transmits the image data; an electrical apparatus which is connected to the printing server so as to communicate with each other, and transmits print data to the printing server; and an image forming apparatus which is connected to the printing server so as to communicate with each other, receives image data from the printing server, and forms an image based on the image data, comprising: a creating step of display data for displaying an image corresponding to the additional image together with an image based on the print data; and a displaying step of an image based on the created display data; wherein the printing server determines whether or not an image based on the print data is formed on only one side of a recording paper; and when the printing server determines that the image is formed on only one side of a recording paper, the printing server creates image data so that the additional image is formed on the other side of the recording paper.

The printing method according to the present invention is characterized in that the image corresponding to the additional image is different from the additional image.

The printing method according to the present invention is characterized in that the additional image varies with date and time at which an image based on the image data should be formed.

The printing method according to the present invention is characterized in that said printing server specifies a location at which an apparatus which should form an image based on the print data is provided, and the additional image varies with the specified location.

In the present invention, when print data is accumulated, display data for displaying, on other apparatus, an image based on the print data and an image corresponding to an additional image to be added to the image is created, and transmitted to the other apparatus. Moreover, when print data is created so that an image is printed on only one side of a recording paper, image data is created so that an additional image is printed on the other side of the recording paper. A side on which an image should be printed may be specified for each image, or may be specified so that the page number is given to the whole image contained in each side, respectively.

Thereby, when an image based on print data is an image to be printed on the front side of a recording paper, an additional image is added so as to be printed on the reverse side of the recording paper. Moreover, display data for previewing an image of the whole printed matter obtained when an additional image is added to an image based on print data is transmitted to the other apparatus.

In the present invention, image data is created so that an image to be contained in an image based on display data as an image corresponding to an additional image and an image to be contained in an image based on image data as an actual additional image are different from each other.

Thereby, since an image added for preview display and an image added to printed matter are different from each other, it is possible to give visual effects which are different from each other at each time, to a user who obtains printed matter after previewing.

In the present invention, image data is created so that an additional image varies with date and time at which an image should be formed in an apparatus which should form an image based on image data.

That is, by creating image data to be transmitted to an apparatus which should form an image at the time of transmission, an additional image to be printed on printed matter can be differentiated according to date and time at which the printed matter should be obtained.

In the present invention, a location at which an apparatus which should form an image based on image data is provided is specified, and image data is created so that an additional image varies with the specified location.

Thereby, an additional image to be printed on printed matter can be differentiated according to a location where the printed matter should be obtained.

In the present invention, between the printing server and the image forming apparatus which can communicate with each other, the printing server transmits the created image data, and the image forming apparatus receives the image data and forms an image.

Thereby, when an image based on print data accumulated in the printing server is an image to be printed on the front side of a recording paper, printed matter in which an additional image is printed on the reverse side of the recording paper is obtained from the image forming apparatus.

In the present invention, among the printing server, the electrical apparatus, and the image forming apparatus which can communicate with each other, the printing server receives print data transmitted from the electrical apparatus, accumulates the print data, and transmits image data created based on the print data, and the image forming apparatus receives the image data and forms an image.

Thereby, when an image based on print data transmitted from the electrical apparatus to the printing server is an image to be printed on the front side of a recording paper, printed matter in which an additional image is printed on the reverse side of the recording paper is obtained from the image forming apparatus. Moreover, the electrical apparatus previews an image of the whole printed matter obtained when an additional image is added to an image based on print data accumulated in the printing server.

In the present invention, display data for displaying an image based on print data transmitted from the electrical apparatus and accumulated in the printing server, and an image corresponding to an additional image to be added to the image is created, and an image based on the created display data is displayed. Moreover, when print data is created so that an image is printed on only one side of a recording paper, the printing server creates image data so that an additional image is printed on the other side of the recording paper.

Thereby, display data for previewing an image of the whole printed matter obtained when an additional image is added to an image based on print data is created, and the display data is previewed. Moreover, when an image based on print data is an image to be printed on the front side of a recording paper, printed matter in which an additional image is printed on the reverse side of the recording paper is obtained.

In the present invention, when the electrical apparatus transmits print data to the printing server, the electrical apparatus receives information representing an image corresponding to an additional image from the printing server, creates display data, and displays an image based on the created display data.

Thereby, display data for preview display is created in the electrical apparatus.

In the present invention, before the image forming apparatus forms an image based on image data, the image forming apparatus receives information representing an image corresponding to an additional image and print data from the printing server, creates display data, and displays an image based on the created display data.

Thereby, an image is previewed in the image forming apparatus.

According to the present invention, when an image based on print data is an image to be printed on the front side of a recording paper, an additional image is added so as to be printed on the reverse side of the recording paper. Moreover, display data for displaying an image of the whole printed matter obtained when an additional image is added to an image based on print data is transmitted to other apparatus.

Therefore, image data in which other image is added to one image to be printed on one side of a recording paper without overlapping with each other is created, and the whole print image can be displayed.

The above and further objects and features will more fully be apparent from the following detailed description with accompanying drawings.

BRIEF DESCRIPTION OF THE DRAWINGS

FIG. 1 is an explanatory diagram showing a configuration example of a printing system provided with a printing server according to the present invention.

FIG. 3 is a block diagram showing an essential configuration of a personal computer (PC).

DETAILED DESCRIPTION OF THE INVENTION

Figure 2:
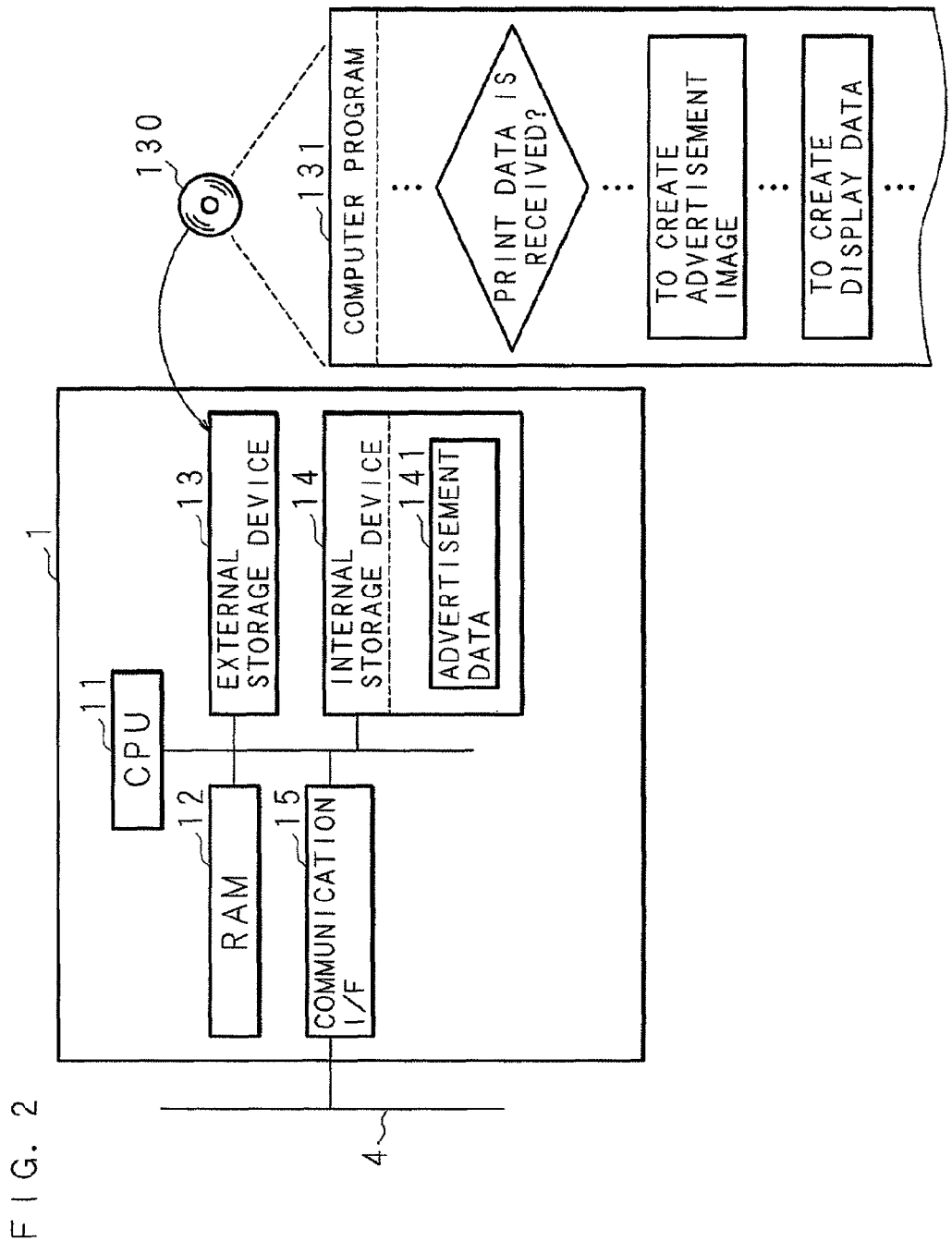
FIG. 2 is a block diagram showing an essential configuration of the printing server.

Hereinafter, the present invention will be explained in detail based on the drawings showing Embodiments thereof.

Embodiment 1

FIG. 1 is a block diagram showing a configuration example of a printing system provided with a printing server according to the present invention. In the drawings, a reference number 1 is the printing server, and the printing server 1 is connected with a personal computer (hereinafter referred to as PC) 2, and a digital complex machine (hereinafter referred to as MFP: Multi Function Peripheral) 3 via the Internet 4. The Internet 4 may be other networks, such as an intranet.

FIG. 2 is a block diagram showing an essential configuration of the printing server 1. The printing server 1 is provided with a CPU 11 which executes a process, such as an operation etc., and the CPU 11 is connected, by a bus, with a RAM 12 which stores temporary information created in connection with a process, an external storage device 13, such as a CD-ROM drive, an internal storage device 14, such as a hard disk, and a communication I/F 15 which communicates with an external apparatus via the Internet 4. The CPU 11 reads a computer program 131 from a recording medium 130, such as a CD-ROM, by the external storage device 13, and stores the read computer program 131 in the internal storage device 14. The computer program 131 may be permanently stored in the internal storage device 14. The computer program 131 is loaded from the external storage device 13 or the internal storage device 14 into the RAM 12 if necessary, and the CPU 11 executes a process required for the printing server 1 based on the loaded computer program 131. The print data received by the printing server 1 via the communication I/F 15, and the created image data are once stored in the internal storage device 14, but they may be stored in the RAM 12. Advertisement data representing an advertisement image (additional image) to be added to an image based on image data is stored in an advertisement database 141 recorded in the internal storage device 14.

Note that the CPU 11 is constituted so as to function as a creating section, a determining section, a specifying section, and the like, which are defined in claims.

FIG. 3 is a block diagram showing an essential configuration of the PC 2. The PC 2 is provided with a CPU 21 which functions as a control center, and the CPU 21 is connected, by a bus, with a ROM 22 which stores information, such as a program etc., and a RAM 23 which stores temporarily created information. The CPU 21 executes a process, such as an input-output process, an operation, etc., in accordance with a control program stored in the ROM 22 in advance. The PC 2 is further provided with an internal storage device 24 which is constituted of a hard disk, a communication I/F 25 for connecting with the Internet 4, a display I/F 26 for connecting with a display section 261 which is constituted of a liquid crystal display (hereinafter referred to as LCD), and an input I/F 27 for connecting with a keyboard 271 and a mouse 272, and they are connected with the CPU 21 by a bus. Document data created by a user using the PC 2 is stored in the internal storage device 24.

Figure 4:
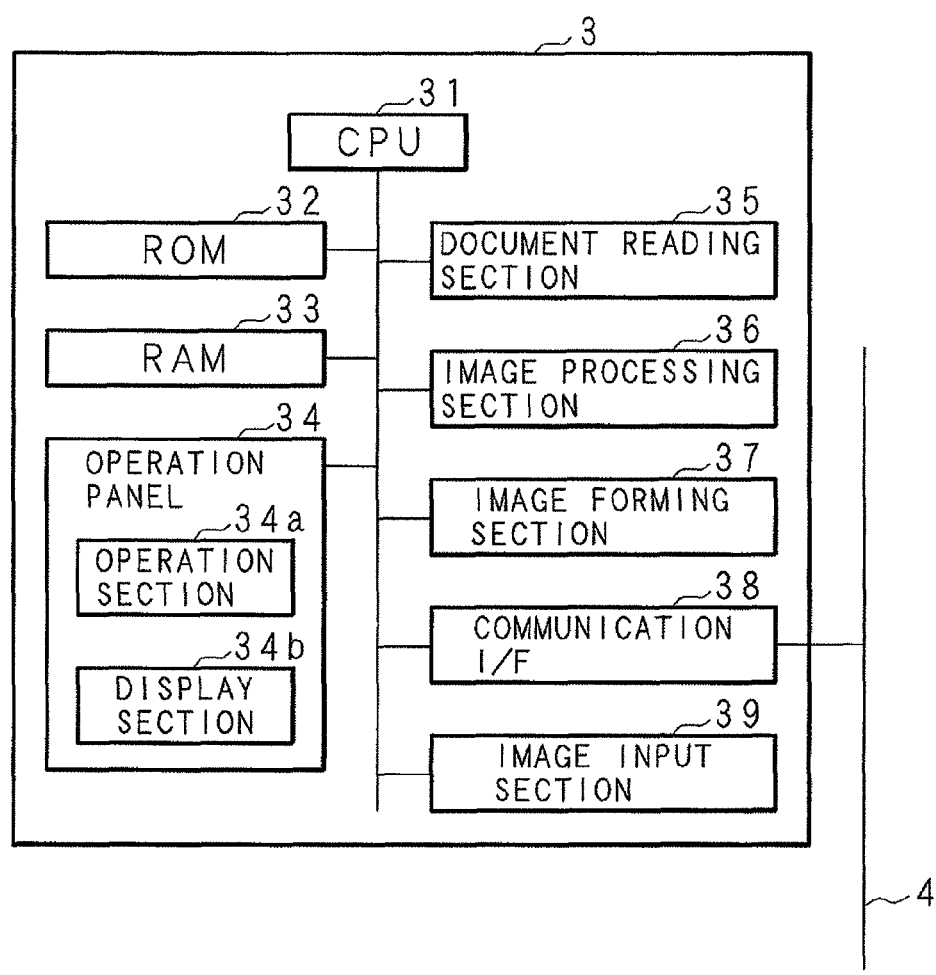
FIG. 4 is a block diagram showing an essential configuration of a multi-function peripheral (MFP).

FIG. 4 is a block diagram showing an essential configuration of the MFP 3. The MFP 3 is provided with a CPU 31, and the CPU 31 is connected, by a bus, with a ROM 32 which stores information, such as a program etc., and a RAM 33 which stores temporarily created information. The CPU 31 executes a process, such as an input-output process, an operation, etc., in accordance with a control program stored in the ROM 32 in advance. Also, the CPU 31 is further connected, by the bus, with an operation panel 34 having an operating section 34a for accepting a user's operation and a display section 34b which is constituted of an LCD, a document reading section 35 which reads a document and acquires image data, an image processing section 36 which converts the acquired image data into data suitable for a print process, an image forming section 37 which forms an image based on the image data, a communication I/F 38 which communicates with an external apparatus via the Internet 4, and an image input section 39 which acquires image data from an external storage device.

In the above configuration, for example, when a user requests print of a document created using the PC 2 to the printing server 1, print data representing the created document is transmitted from the PC 2 to the printing server 1, and is accumulated in the printing server 1. At that time, the printing server 1 creates display data representing a preview image in which an advertisement image is added to an image based on the received print data, and transmits the display data to the PC 2, and the PC 2 previews an image based on the received display data on the display section 261.

Then, the printing server 1 creates image data representing an image based on the accumulated print data and an advertisement image to be added to the image, and transmits the image data to the MFP 3, and the MFP 3 forms an image based on the received image data on a recording paper, and outputs printed matter.

When an image based on print data is printed on only the front side of a recording paper, an advertisement image is printed on the reverse side of the recording paper. When being previewed in the PC 2 in advance of print, both an image on the front side and an image on the reverse side containing only an advertisement image are displayed. When an image based on print data is printed on the front side and the reverse side of a recording paper, although an advertisement image is not created in the present embodiment, an advertisement image may be created not so as to overlap with an image based on print data as much as possible, and may be printed on the front side or the reverse side of a recording paper.

In the following, processing contents in respective apparatuses which constitute the printing system are mainly explained using flow charts. First, a processing to be performed from accumulation of print data to registration of the print data onto a print job is explained.

Figure 5:
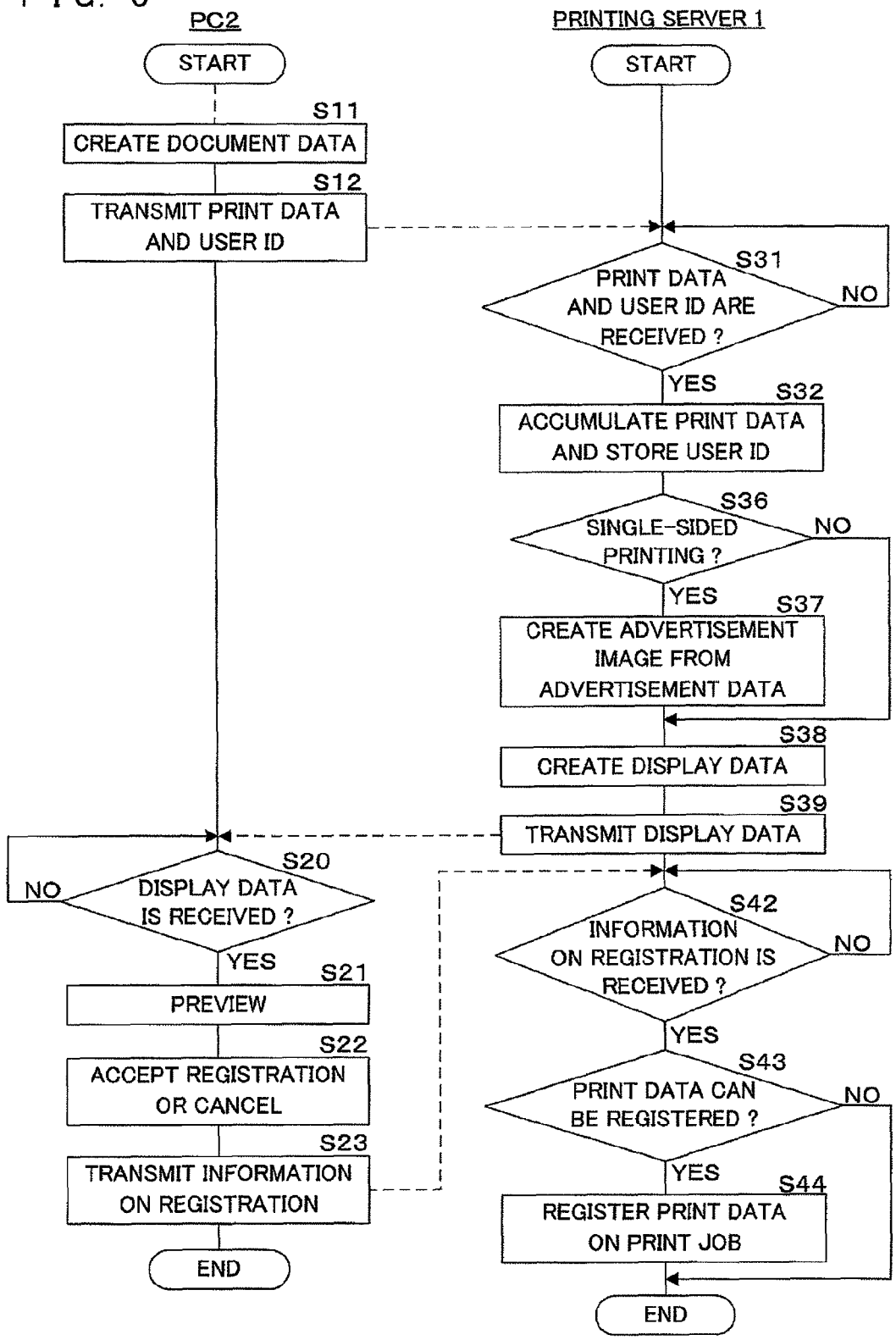
FIG. 5 is a flow chart showing the procedures of a CPU of the PC which transmits and previews the print data, and a CPU of the printing server which creates display data for preview display from the print data.

FIG. 5 is a flow chart showing the procedures of the CPU 21 of the PC 2 which transmits and previews print data, and the CPU 11 of the printing server 1 which creates display data for preview display from the print data. For example, when the CPU 21 of the PC 2 creates document data according to a user's operation (S11), the CPU 21 transmits, to the printing server 1, print data based on the document data, and a user ID stored in the internal storage device 24 in advance according to a user of the PC 2 (S12).

In the printing server 1, the CPU 11 determines whether or not the print data and the user ID are received from the PC 2 (S31), and it waits until the print data and the user ID are received (S31: NO). When the print data and the user ID are received (S31: YES), the CPU 11 stores the received print data in the internal storage device 14, associates the received user ID with the stored print data, and stores it in the internal storage device 14 (S32). Then, the CPU 11 determines whether or not single-sided printing is specified for the accumulated print data (S36). When the single-sided printing is specified (S36: YES), the CPU 11 extracts advertisement data according to the user ID from the advertisement database 141, and creates an advertisement image from the extracted advertisement data (S37).

When double-sided printing is specified at Step S36 (S36: NO), or when the process of Step S37 is completed, the CPU 11 creates display data for causing the PC 2 to preview it (S38), and transmits the created display data to the PC 2 (S39). In this case, when an advertisement image is created at Step S37, display data is created so that a state where an advertisement image is printed on the reverse side of the final printed matter is previewed. However, when an advertisement image does not overlap with an image based on the accumulated print data, display data may be created so that an advertisement image is printed on the front side of the final printed matter.

On the other hand, in the PC 2, the CPU 21 determines whether or not display data is received from the printing server 1 (S20), and it waits until the display data is received (S20: NO). When the display data is received (S20: YES), the CPU 21 previews an image based on the received display data on the LCD of the display section 261 (S21).

Figure 6:
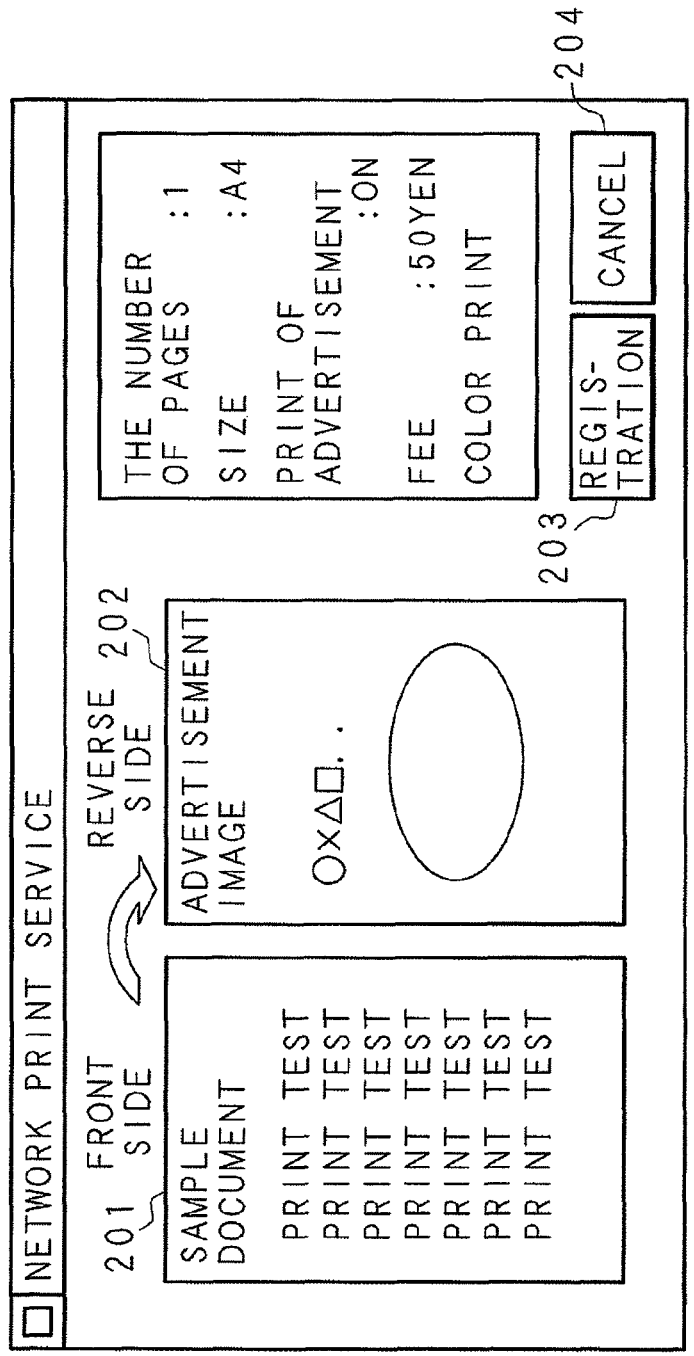
FIG. 6 is an explanatory diagram showing an example of a screen to be previewed on a liquid crystal display (LCD) of a display section.

FIG. 6 is an explanatory diagram showing an example of a screen to be previewed on the LCD of the display section 261. An image 201 on the front side of the final printed matter and an image 202 on the reverse side thereof are displayed adjacent to each other on a display area extending from a left end part of the screen to a central part thereof. In the present embodiment, only an advertisement image is contained in the image 202 on the reverse side. Information, such as the number of pages, a document size, a fee, a distinction of color/monochrome, etc. is displayed on a display area on a right side of the screen. A registration button 203 for setting registration of print data corresponding to the image being previewed and a cancel button 204 for setting cancellation thereof are displayed on a lower right part of the screen.

Now, return to FIG. 5. While previewing at Step S21, the CPU 21 accepts an operation of the registration button 203 or the cancel button 204 (S22), and when the operation of the registration button 203 is accepted, the CPU 21 determines that the print data can be registered, and when the operation of the cancel button 204 is accepted, it determines that it cannot be registered. Then, the CPU 21 transmits information on the registration to the printing server 1 (S23), and completes the processing of FIG. 5.

On the other hand, in the printing server 1, the CPU 11 determines whether or not the information on the registration is received (S42), and it waits until the information on the registration is received (S42: NO). When the information on the registration is received (S42: YES), the CPU 11 determines whether or not the print data can be registered (S43), and when the print data can be registered (S43: YES), the CPU 11 registers the accumulated print data on a print job (S44), and completes the processing of FIG. 5. When the print data cannot be registered (S43: NO), the CPU 11 completes the processing of FIG. 5, without registering it on a print job.

Next, a processing to be performed from execution of a print job on which print data is registered to output of printed matter is explained.

Figure 7:
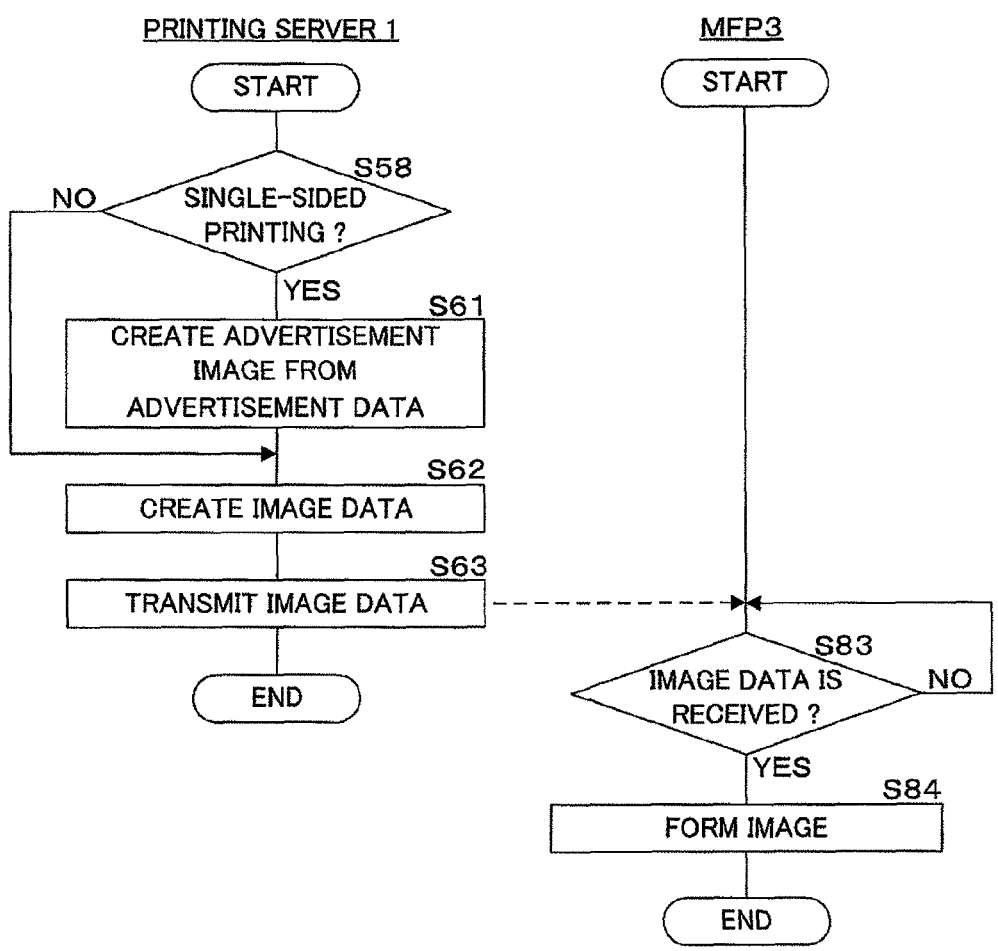
FIG. 7 is a flow chart showing the procedures of the CPU of the printing server which creates and transmits the image data, and a CPU of the MFP which receives the image data and forms an image.

FIG. 7 is a flow chart showing the procedures of the CPU 11 of the printing server 1 which creates image data and transmits it, and the CPU 31 of the MFP 3 which receives the image data and forms an image. When the print job on which the print data is registered by the printing server 1 is executed, the CPU 11 of the printing server 1 determines whether or not the single-sided printing is specified for the accumulated print data of the print job (S58), and when the single-sided printing is specified (S58: YES), the CPU 11 extracts from the advertisement database 141 advertisement data according to the user ID stored in association with the print data, and creates an advertisement image from the extracted advertisement data (S61). The advertisement image in this case may be the same as the advertisement image created at Step S37 of FIG. 5, or may be different from it.

When the double-sided printing is specified at Step S58 (S58: NO), or when the process of Step S61 is completed, the CPU 11 creates image data for forming an image by the MFP 3 (S62), transmits the created image data to the MFP 3 (S63), and completes the processing of FIG. 7. In this case, when an advertisement image is created at Step S61, image data is created so that the advertisement image is printed on the reverse side of the final printed matter. However, when display data is created at Step S38 of FIG. 5 so that the advertisement image is printed on the front side of the final printed matter, image data is created so that an advertisement image is printed on the front side of printed matter.

On the other hand, in the MFP 3, the CPU 31 determines whether or not the image data is received from the printing server 1 (S83), and it waits until it is received (S83: NO). When the image data is received (S83: YES), the CPU 31 forms an image based on the received image data on a recording paper (S84), and completes the processing of FIG. 7.

According to Embodiment 1 as described above, when print data is accumulated, display data for causing the PC to display an image based on print data and an image corresponding to an advertisement image to be added to the image is created, and transmitted to the PC. Moreover, when print data is created so that an image is printed on only one face of a recording paper, image data is created so that an advertisement image is printed on the other side of the recording paper.

Thereby, when an image based on print data is an image to be printed on the front side of a recording paper, an advertisement image is added so that it is printed on the reverse side of the recording paper. Moreover, display data for previewing an image of the whole printed matter obtained when an advertisement image is added to an image based on print data is transmitted to the PC.

Therefore, it is possible to create image data in which other image is added to one image to be printed on one side of a recording paper without overlapping with each other, and preview the whole print image.

Moreover, among the printing server, the PC and the MFP which can communicate with each other via the Internet, the printing server receives the print data transmitted from the PC and accumulates the print data, and the printing server transmits image data created based on the accumulated print data, and the MFP receives the image data and forms an image.

Therefore, when an image based on the print data transmitted from the PC is an image to be printed on the front side of the recording paper, printed matter in which an advertisement image is printed on the reverse side of the recording paper is obtained from the MFP. Moreover, an image of the whole printed matter obtained when an advertising image is added to an image based on print data accumulated in the printing server can be previewed in the PC.

Embodiment 2

Although Embodiment 1 has a configuration in which one MFP 3 is connected to the Internet 4, Embodiment 2 has a configuration in which a plurality of MFPs 3 (not shown) are connected to the Internet 4. A plurality of PCs 2 may be connected to the Internet 4.

In Embodiment 2, information on the plurality of MFPs 3 connected to the Internet 4, such as a network address, an MFP-ID, an setting location, etc. is registered on the printing server 1. When the PC 2 transmits print data to the printing server 1, the PC 2 causes a user to select one MFP 3 from a list of the MFPs 3 transmitted from the printing server 1, and notifies the printing server 1 of an MFP-ID of the selected MFP 3. The printing server 1 transmits image data to the MFP 3 labeled by MFP-ID which was notified.

Figure 8:
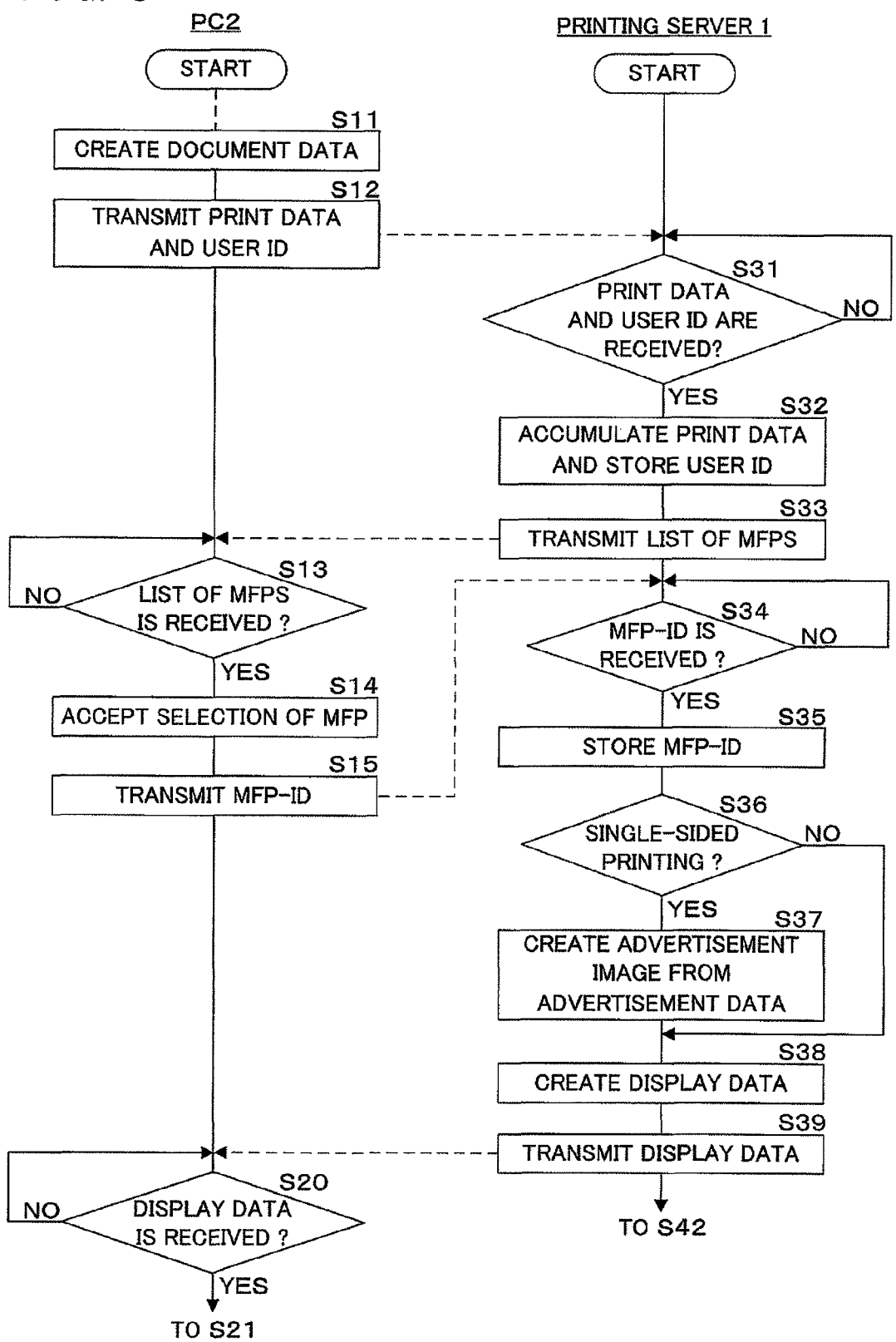
FIG. 8 is a flow chart showing the procedures of the CPU of the PC which transmits print data and accepts selection of the MFP, and the CPU of the printing server which transmits image data to the MFP selected in the PC.

FIG. 8 is a flow chart showing the procedures of the CPU 21 of the PC 2 which transmits print data and accepts selection of an MFP, and the CPU 11 of the printing server 1 which transmits image data to the MFP 3 selected in the PC 2. In the same manner as Embodiment 1, when the CPU 21 of the PC 2 creates document data according to a user's operation (S11), the CPU 21 transmits, to the printing server 1, print data based on the document data and a user ID registered on the internal storage device 24 in advance according to the user of the PC 2 (S12).

In the printing server 1, the CPU 11 determines whether or not the print data and the user ID are received from the PC 2 (S31), and it waits until the print data and the user ID are received (S31: NO). When the print data and the user ID are received (S31: YES), the CPU 11 accumulates the received print data in the internal storage device 14, associates the received user ID with the stored print data, and stores the user ID in the internal storage device 14 (S32). Then, the CPU 11 transmits the list of the MFPs 3 to the PC 2, based on the information on the MFP 3 registered on the internal storage device 14 (S33).

On the other hand, in the PC 2, the CPU 21 determines whether or not the list of the MFPs 3 is received from the printing server 1 (S13), and it waits until the list of the MFPs is received (S13: NO). When the list of the MFPs 3 is received (S13: YES), the CPU 21 displays the received list of the MFPs 3 on the LCD of the display section 261, and accepts selection of an MFP 3 (S14). Then, the CPU 21 transmits an MFP-ID of the MFP 3 of which selection is accepted to the printing server 1 (S15). Since the processing contents from Step S20 to Step S23 to be executed by the CPU 21 by the time of completing the processing of FIG. 8 are the same as those of FIG. 5 of Embodiment 1, the description thereof is omitted.

On the other hand, in the printing server 1, the CPU 11 determines whether or not the MFP-ID is received (S34), and it waits until the MFP-ID is received (S34: NO). When the MFP-ID is received (S34: YES), the CPU 11 associates the received MFP-ID with the stored print data, and stores the MFP-ID in the internal storage device 14 (S35). Since the processing contents after Step S36 to be executed by the CPU 11 by the time of completing the processing of FIG. 8 are the same as those of FIG. 5 of Embodiment 1, the description thereof is omitted.

Note that when advertisement data is extracted according to a user ID from the advertisement database 141 at Step S37, the advertisement data may be extracted according to not only the user ID but also the MFP-ID.

Further, the same parts as in Embodiment 1 are designated with the same reference numbers, and detailed description thereof will be omitted. However, in Step S63 of FIG. 7, image data is transmitted to the MFP 3 having the stored MFP-ID. Moreover, in Step S61 of FIG. 7, advertisement data may be extracted according to the MFP-ID in the same manner as Step S37 of FIG. 8.

According to Embodiment 2 as described above, when print data is accumulated, an MFP is selected by a user of a PC, and an MFP-ID of the selected MFP is stored in association with print data in the internal storage device of the printing server.

Therefore, it is possible to transmit image data to an MFP which should finally output printed matter. Moreover, it is also possible to use an image according to the selected MFP as an advertisement image contained in an image based on the image data.

Embodiment 3

Although Embodiment 1 has a configuration which creates an advertisement image from advertisement data according to a user ID, Embodiment 3 has a configuration which creates an advertisement image from advertisement data according to not only a user ID but also date and time at which printed matter should be obtained and an setting location of the MFP 3.

In Embodiment 3, a plurality of the MFPs 3 are connected to the Internet 4, and when a user logs into one MFP 3, a user ID and an MFP-ID are transmitted to the printing server 1. The printing server 1 creates a print list from a print job corresponding to the received user ID, and transmits the print list to the MFP 3. The MFP 3 receives image data according to a selection result of the print list from the printing server 1, and forms an image on a recording paper. When the printing server 1 creates image data, advertisement data is extracted according to date and time at which the image data is created and an setting location of an MFP 3, and an advertisement image is created from the extracted advertisement data.

Figure 9:
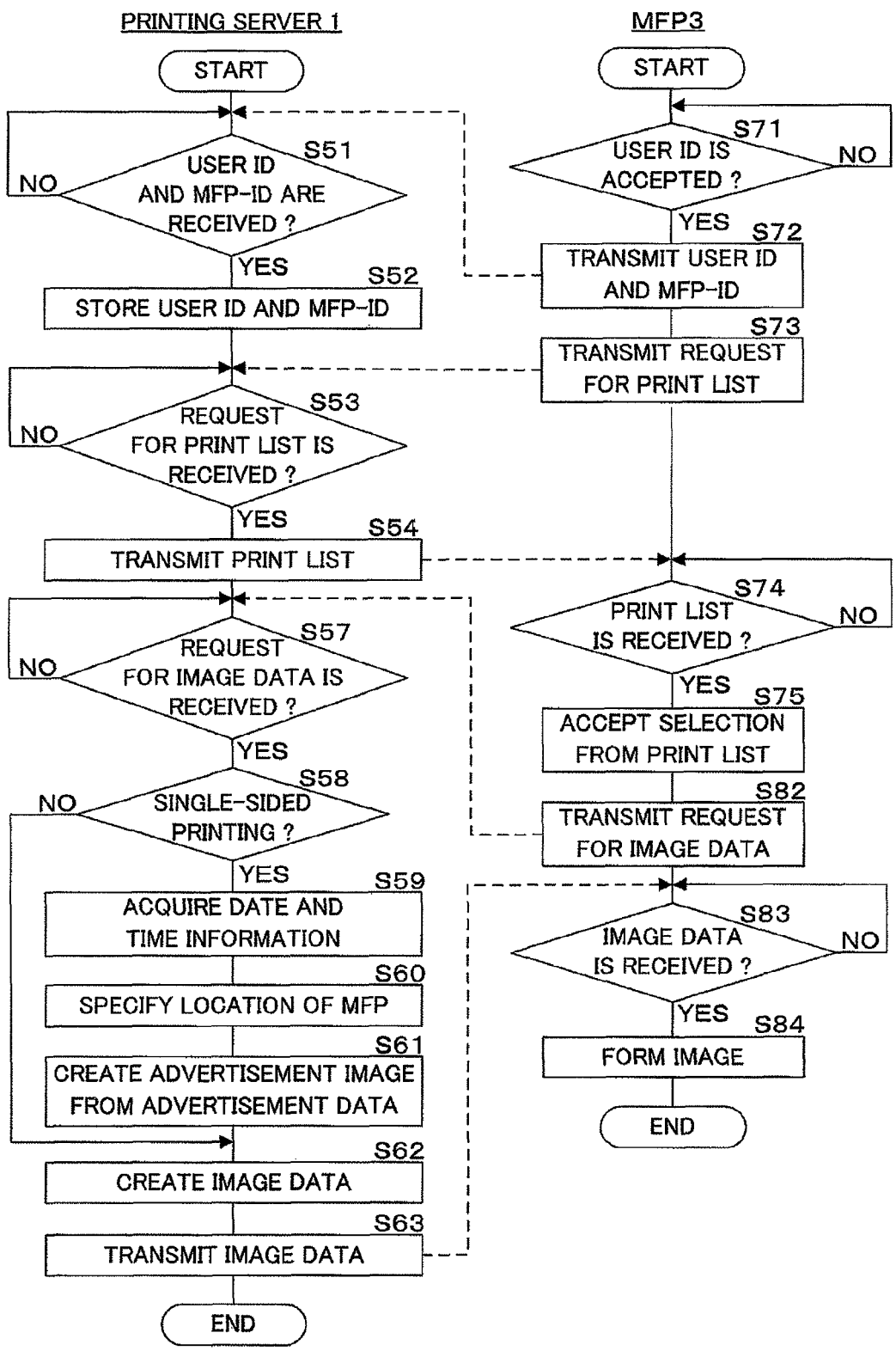
FIG. 9 is a flow chart showing the procedures of the CPU of the printing server which creates image data according to date and time and an setting location of the MFP and transmits the image data, and the CPU of the MFP which receives the image data and forms an image.

FIG. 9 is a flow chart showing the procedures of the CPU 11 of the printing server 1 which creates image data according to date and time and an setting location of an MFP 3 and transmits the image data, and the CPU 31 of the MFP 3 which receives the image data and forms an image. The CPU 31 of the MFP 3 determines whether or not a user ID is accepted from a card reader (not shown), for example (S71), and it waits until a user ID is accepted (S71: NO). When the user ID is accepted (S71: YES), the CPU 31 transmits the accepted user ID and an MFP-ID of the MFP 3 itself to the printing server 1 (S72). Then, the CPU 31 transmits a request for a print list according to the user ID to the printing server 1 (S73).

On the other hand, in the printing server 1, the CPU 11 determines whether or not the user ID and the MFP-ID are received (S51), and it waits until the user ID and MFP-ID are received (S51: NO). When the user ID and the MFP-ID are received (S51: YES), the CPU 11 stores the received user ID and MFP-ID in the RAM 12 (S52). Then, the CPU 11 determines whether or not the request for the print list is received (S53), and it waits until the request for the print list is received (S53: NO). When the request for the print list is received (S53: YES), the CPU 11 creates a print list from a print job in which print data corresponding to the stored user ID is contained, and transmits the print list (S54).

On the other hand, in the MFP 3, the CPU 31 determines whether or not the print list is received (S74), and it waits until the print list is received (S74: NO). When the print list is received (S74: YES), the CPU 31 displays the received print list, for example on the display section 34b, accepts selection of image data from the print list by a user (S75), and transmits a request for image data according to a selection result (S82). Since the processing contents of Step S83 and Step S84 to be executed by the CPU 31 by the time of completing the processing of FIG. 9 are the same as those of FIG. 7 of Embodiment 1, the description thereof is omitted.

On the other hand, in the printing server 1, the CPU 11 determines whether or not the request for image data is received (S57), and it waits until the request for image data is received (S57: NO). When the request for image data is received (S57: YES), the CPU 11 determines whether or not single-sided printing is specified about the accumulated print data in the same manner as Embodiment 1 (S58), and when the single-sided printing is not specified (S58: NO), the CPU 11 moves the processing to Step S62. When the single-sided printing is specified (S58: YES), the CPU 11 acquires date and time information at that time from a timer (not shown) (S59). Then, the CPU 11 specifies an setting location of an MFP 3 having the received MFP-ID from position information of the MFP 3 registered on the internal storage device 14 in advance according to the MFP-ID (S60), extracts advertisement data according to the user ID, the date and time information and the setting location of the MFP 3 from the advertisement database 141, and creates an advertisement image from the extracted advertisement data (S61).

Since the processing contents of Step S62 and Step S63 to be executed by the CPU 11 by the time of completing the processing of FIG. 9 are the same as those of FIG. 7 of Embodiment 1, the description thereof is omitted.

Further, the same parts as in Embodiment 1 are designated with the same reference numbers, and detailed description thereof will be omitted.

According to Embodiment 3 as described above, image data is created so that an image contained in an image based on display data as an image which should correspond to an advertisement image, and an image contained in an image based on image data as an actual advertisement image are different from each other.

Therefore, since an image added for preview display and an advertisement image added to printed matter are different from each other, it is possible to give visual effects which are different from each other at each time, to a user who obtains printed matter after previewing.

Moreover, image data is created so that an advertisement image varies with date and time at which an image should be formed in an MFP which should form an image based on image data.

Therefore, since image data to be transmitted to an apparatus which should form an image is created at the time of transmission, it is possible to differentiate an advertisement image to be printed on printed matter according to date and time at which the printed matter should be obtained.

Furthermore, a location at which an MFP which should form an image based on image data is installed is specified, and image data is created so that an advertisement image varies with the specified location.

Therefore, it is possible to differentiate an advertisement image to be printed on printed matter according to a location where the printed matter should be obtained.

Embodiment 4

Although Embodiment 1 has a configuration which creates display data for preview display in the printing server 1, Embodiment 4 has a configuration which creates display data in the PC 2 and previews the display data in the PC 2 itself.

In Embodiment 4, the printing server 1 extracts advertisement data according to a user ID, and transmits it to the PC 2. The PC 2 creates display data from the received advertisement data and print data based on the created document data, and previews the display data on the display section 261.

Figure 10:
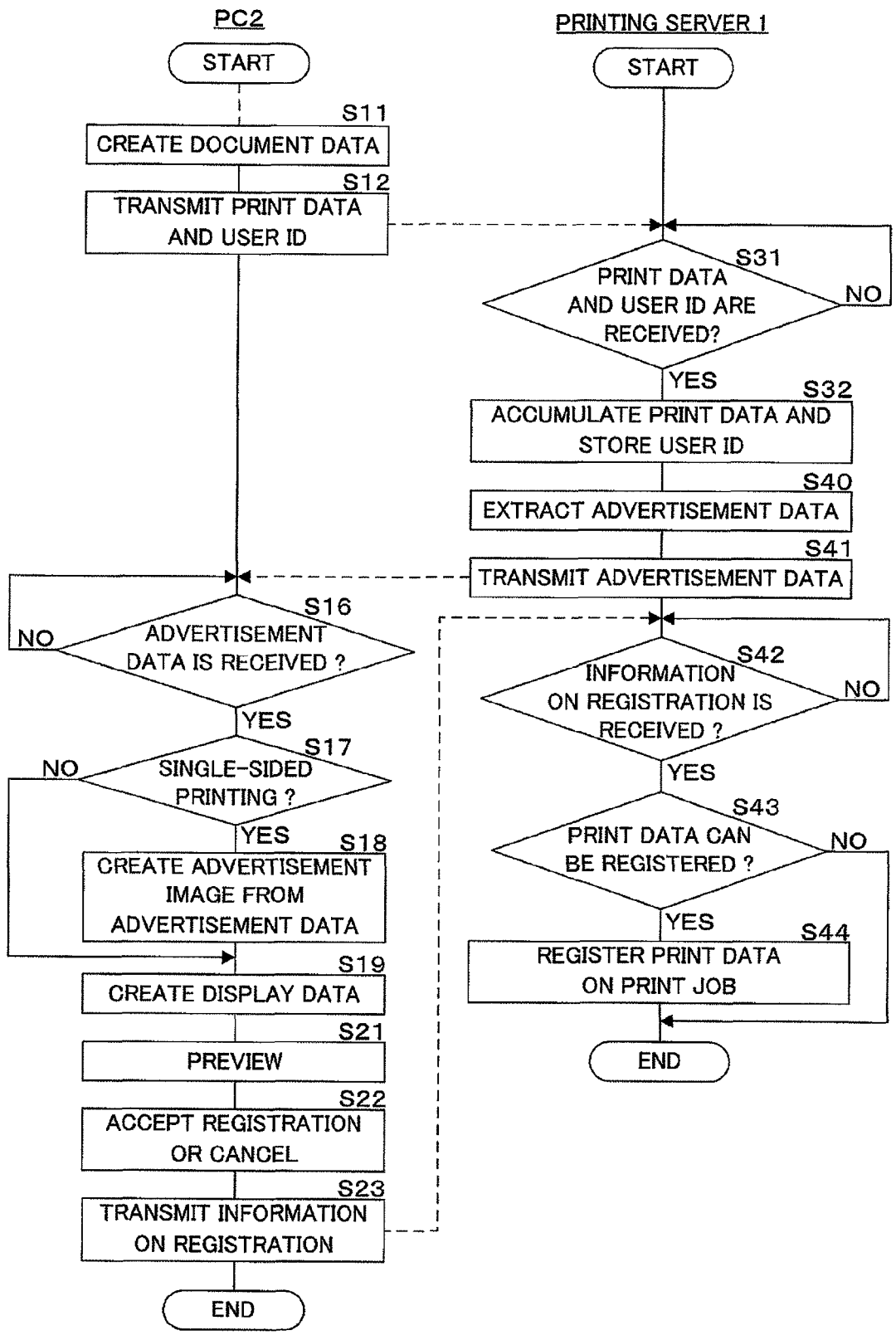
FIG. 10 is a flow chart showing the procedures of the CPU of the PC which creates display data for itself and previews it, and the CPU of the printing server which extracts advertisement data and transmits it.

FIG. 10 is a flow chart showing the procedures of the CPU 21 of the PC 2 which creates display data for itself and previews it, and the CPU 11 of the printing server 1 which extracts advertisement data and transmits it. In the same manner as Embodiment 1, when the CPU 21 of the PC 2 creates document data according to a user's operation (S11), the CPU 21 transmits, to the printing server 1, print data based on the document data and a user ID registered on the internal storage device 24 in advance according to the user of the PC 2 (S12).

In the printing server 1, in the same manner as Embodiment 1, the CPU 11 determines whether or not the print data and the user ID are received from the PC 2 (S31), and it waits until the print data and the user ID are received (S31: NO). When the print data and the user ID are received (S31: YES), the CPU 11 accumulates the received print data in the internal storage device 14, associates the received user ID with the stored print data, and stores the user ID in the internal storage device 14 (S32). Then, the CPU 11 extracts advertisement data according to the user ID from the advertisement database 141 (S40), and transmits the extracted advertisement data (S41). Since the processing contents from Step S42 to Step S44 to be executed by the CPU 11 by the time of completing the processing of FIG. 10 are the same as those of FIG. 5 of Embodiment 1, the description thereof is omitted.

On the other hand, in the PC 2, the CPU 21 determines whether or not advertisement data is received from the printing server 1 (S16), and it waits until advertisement data is received (S16: NO). When the advertisement data is received (S16: YES), the CPU 21 determines whether or not single-sided printing is specified about print data based on the created document data (S17), and when the single-sided printing is specified (S17: YES), the CPU 21 creates an advertisement image from the received advertisement data (S18).

When double-sided printing is specified at Step S17 (S17: NO), or when the process of Step S18 is completed, the CPU 21 creates display data (S19). Since the processing contents from Step S21 to Step S23 to be executed by the CPU 21 by the time of completing the processing of FIG. 10 are the same as those of FIG. 5 of Embodiment 1, the description thereof is omitted.

Further, the same parts as in Embodiment 1 are designated with the same reference numbers, and detailed description thereof will be omitted.

According to Embodiment 4 as described above, when the PC transmits print data to the printing server, the PC receives advertisement data representing an image which should correspond to an advertisement image from the printing server, creates display data, and previews an image based on the created display data.

Therefore, it is possible to create display data for preview display in the PC which transmits print data to the printing server.

Embodiment 5

Although Embodiment 1 has a configuration which creates display data for preview display in the printing server 1, Embodiment 5 has a configuration which creates display data in the MFP 3 and previews it in the MFP 3 itself before output of printed matter in which an advertisement image is printed.

In Embodiment 5, the printing server 1 accessed from the MFP 3 transmits, to the MFP 3, print data according to a user ID and the extracted advertisement data. The MFP 3 creates display data from the received print data and advertisement data, and previews the display data on the display section 34b.

Figure 11:
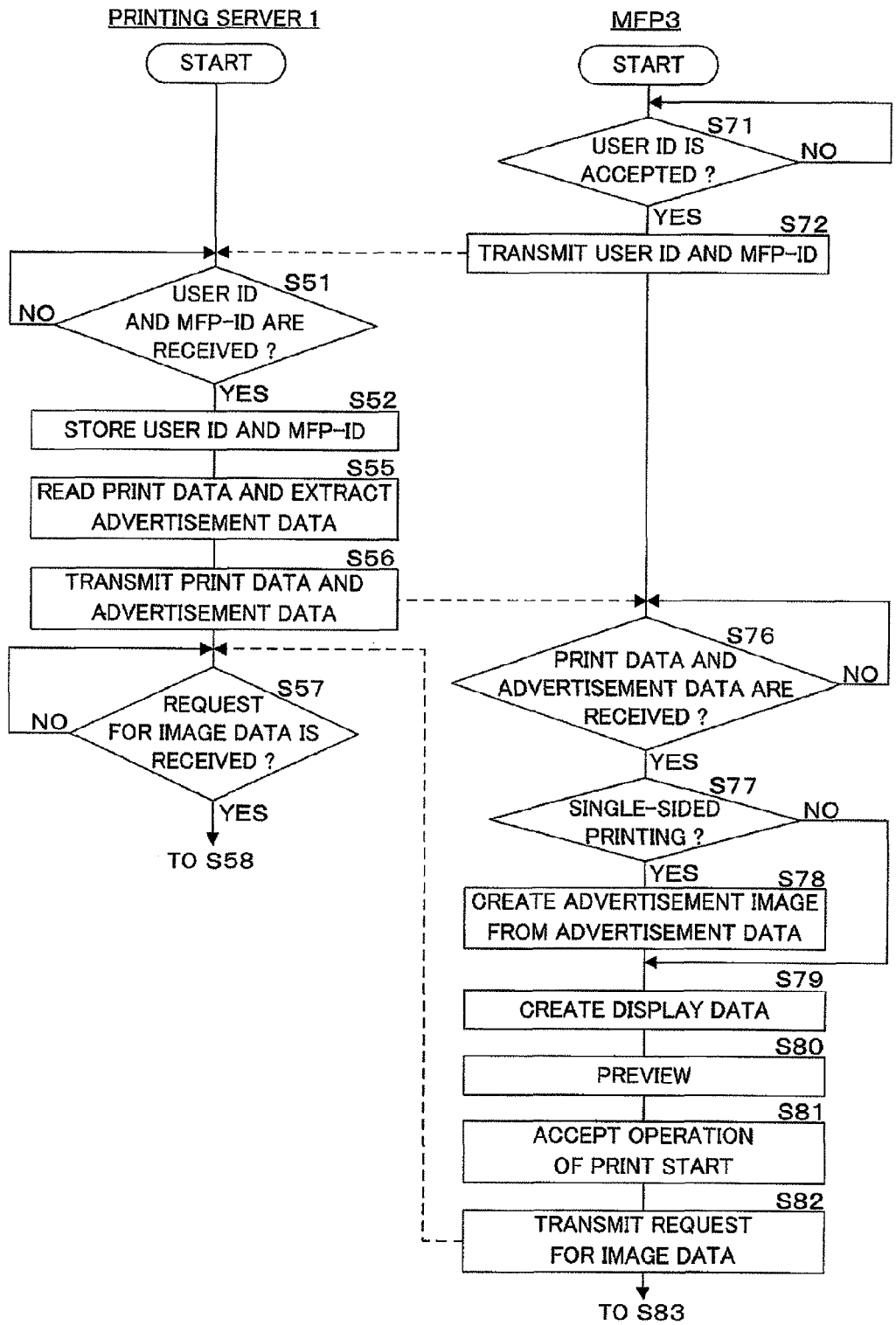
FIG. 11 is a flow chart showing the procedures of the CPU of the printing server which transmits accumulated print data and extracted advertisement data, and the CPU of the MFP which creates display data for itself and previews it.

FIG. 11 is a flow chart showing the procedures of the CPU 11 of the printing server 1 which transmits the accumulated print data and the extracted advertisement data, and the CPU 31 of the MFP 3 which creates display data for itself and previews it. The CPU 31 of the MFP 3 determines whether or not a user ID is accepted from a card reader (not shown) in the same manner as Embodiment 3 (S71), and it waits until a user ID is accepted (S71: NO). When it is accepted (S71: YES), the CPU 31 transmits the accepted user ID and an MFT-ID of the MFP 3 itself to the printing server 1 (S72).

On the other hand, in the printing server 1, in the same manner as Embodiment 3, the CPU 11 determines whether or not the user ID and the MFP-ID are received (S51), and it waits until the user ID and the MFP-ID are received (S51: NO). When the user ID and the MFP-ID are received (S51: YES), the CPU 11 stores the received user ID and MFP-ID in the RAM 12 (S52). Then, the CPU 11 reads print data contained in a print job according to the received user ID, extracts advertisement data according to the user ID from the advertisement database 141 (S55), and transmits the read print data and the extracted advertisement data (S56). Since the processing contents from Step S57 to Step S63 to be executed by the CPU 11 by the time of completing the processing of FIG. 11 are the same as those of FIG. 9 of Embodiment 3, the description thereof is omitted.

On the other hand, in the MFP 3, the CPU 31 determines whether or not the print data and the advertisement data are received from the printing server 1 (S76), it waits until the print data and the advertisement data are received (S76: NO). When the print data and the advertisement data are received (S76: YES), the CPU 31 determines whether or not single-sided printing is specified about the received print data (S77), and when the single-sided printing is specified (S77: YES), the CPU 31 creates an advertisement image from the received advertisement data (S78).

When double-sided printing is specified at Step S77 (S77: NO), or when the process of Step S78 is completed, the CPU 31 creates display data (S79) and previews an image based on the created display data on the LCD of the display section 34b (S80). Then, the CPU 31 accepts an operation of print start by a user (S81), and transmits a request for image data (S82). Since the processing contents of Step S83 and Step S84 to be executed by the CPU 31 by the time of completing the processing of FIG. 11 are the same as those of FIG. 7 of Embodiment 1, the description thereof is omitted.

Further, the same parts as in Embodiments 1 and 3 are designated with the same reference numbers, and detailed description thereof will be omitted.

According to Embodiment 5 as described above, before the MFP forms an image based on image data, the MFP receives advertisement data representing an image which should correspond to an advertisement image and print data from the printing server, creates display data, and displays an image based on the created display data.

Therefore, it is possible to preview the image in the MFP.

Note that in Embodiment 5, when the MFP also serves as a printing server, the MFP can create display data and image data based on print data acquired by itself and the extracted advertisement data, without receiving advertisement data and print data from other apparatus.

Therefore, not only the print data stored in the MFP but also document image data obtained by reading a document image in the MFP, and the print data acquired from an external storage device, such as a USB memory, can be previewed in the MFP before printed matter in which an advertisement image is printed is outputted.

Furthermore, in Embodiments 1 through 5, a method for creating image data so that an additional image is printed on the reverse side of a recording paper and previewing an image of the whole printed matter as described above can be recorded in other computer-readable recording medium in which program codes of the computer program 131 (an execute-form program, an intermediate code program, a source program) are recorded. Thus, it is possible to portably provide a recording medium in which a program for performing said method is recorded.

The recording medium may be a program medium such as memory (not shown), for example, ROM, for a process to be executed by a microcomputer, or the recording medium may be a program medium which can be read by inserting the recording medium into a program reader (not shown) provided as an external storage device. In any case, the stored program codes may be configured so as to be accessed and executed by the CPU 11, or may be configured so as to be executed by reading the program codes and downloading them into a program storage area of the RAM 12 for example. This program for downloading is stored in a main part of the printing server 1 in advance.

Said program medium is a recording medium which is configured so as to be detachable from the main part, or may be a medium carrying program codes in a fixed manner, such as tapes including a magnetic tape and a cassette tape, disks including magnetic disks such as a flexible disk and a hard disk, and optical disks such as a CD-ROM, an MO, an MD, and a DVD, cards such as an IC card (including a memory card) and an optical card, or semiconductor memory such as a mask ROM, an EPROM (Erasable Programmable Read Only Memory), an EEPROM (Electrically Erasable Programmable Read Only Memory) and a flash ROM.

Or the program medium may be a medium carrying program codes in a flowing manner like downloading the program codes from a communication network containing the Internet. In the case where the program codes are downloaded from a communication network in such a manner, a program for downloading may be stored in the main part of the printing server 1 in advance, or installed from other recording medium. Note that the communication network is not especially limited, and for example, the Internet, an intranet, an extra network, a LAN, an ISDN, a VAN, a CATV communication network, a virtual private network, a telephone network, a mobile communication network, a satellite communication network, etc. are available as the communication network.

Moreover, a transmission medium which constitutes a communication network is not especially limited, and for example, not only wires, such as an IEEE1394, a USB, a power line carrier, a cable TV line, a telephone line, and an ADSL line, but also wireless, such as an infrared ray like an IrDA interface or a remote control, a Bluetooth (registered trademark), a 802.11 wireless, an HDR, a portable telephone network, a satellite channel, and a ground wave digital network, etc. are available as the transmission medium. Note that the present invention is also implemented in the form of a computer data signal embedded in a carrier wave in which the program codes are embodied by an electronic transfer.

Embodiments disclosed herein are explained as an example at all the points, and should be considered not to be restrictive. The range of the present invention is shown by not a meaning described above but claims, and it is intended that all the changes within a meaning equivalent to claims are contained.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A printing server which accumulates print data and creates image data representing an image based on the accumulated print data and an additional image to be added to the image, comprising:

a single-side determining section for determining whether or not a print data to be accumulated is created to form an image based on the print data on only one side of a recording paper;

a creating section for creating display data for displaying that the additional image is formed on the other side of the recording paper so as to display an image corresponding to the additional image together with an image based on the print data to be accumulated on other apparatus, when the single-side determining section determines that the print data is created to form the image based on the print data on only one side of the recording paper;

a transmitting section for transmitting display data created by the creating section to the other apparatus; and a receiving section for receiving information showing whether or not the print data can be accumulated from the other apparatus;

wherein when the receiving section receives information showing that the print data can be accumulated, the print data to be accumulated is accumulated, the printing server further comprises, a determining section for determining whether or not the accumulated print data is created to form an image based on the print data is formed on only one side of the recording paper, wherein when the determining section determines that the accumulated print data is created to form an image based on the accumulated print data on only one side of the recording paper, the image data is created so that the additional image is formed on the other side of the recording paper.

2. The printing server according to claim 1, wherein the image corresponding to the additional image is different from said additional image.

3. The printing server according to claim 2, wherein the additional image varies with date and time at which an image based on the image data is to be formed.

4. The printing server according to claim 2, further comprising:

a specifying section for specifying a location at which an apparatus which forms an image based on the print data is provided, wherein the additional image varies with the location specified by the specifying section.

5. A printing system, comprising:

the printing server according to claim 1; and an image forming apparatus which is connected to the printing server so as to communicate with each other, receives image data created by the printing server, and forms an image based on the received image data, wherein the printing server transmits the created image data to the image forming apparatus.

6. A printing system, comprising:

the printing server according to claim 1;

an electrical apparatus which is connected to the printing server so as to communicate with each other, transmits print data to the printing server, receives display data created by the printing server, and displays an image based on the display data; and an image forming apparatus which is connected to the printing server so as to communicate with each other, receives image data created by the printing server, and forms an image based on the image data, wherein the printing server receives print data from the electrical apparatus and accumulates the received print data.

7. A printing system comprising:

a printing server which receives print data, accumulates the print data, creates image data representing an image based on the accumulated print data and an additional image to be added to the image, and transmits the created image data;

an electrical apparatus which is connected to the printing server so as to communicate with each other, and transmits print data to the printing server; and an image forming apparatus which is connected to the printing server so as to communicate with each other, receives the created image data from the printing server, and forms an image based on the received image data, the printing server further including, a single-side determining section for determining whether or not a print data to be accumulated is created to form an image based on the print data on only one side of a recording paper;

a creating section for creating display data for displaying that the additional image is formed on the other side of the recording paper so as to display an image corresponding to the additional image together with an image based on the print data to be accumulated on the electrical apparatus, when the single side determining section determines that the print data is created to form an image based on the print data on only one side of the recording paper; and a transmitting section for transmitting display data created by the creating section to the electrical apparatus;

a receiving section for receiving information showing whether or not the print data can be accumulated from the electrical apparatus;

wherein when the receiving section receives information showing that the print data can be accumulated, the print data to be accumulated is accumulated, wherein the printing server is further provided with a determining section for determining whether or not the accumulated print data is created to form an image based on the accumulated print data on only one side of the recording paper, and when the determining section determines that the accumulated print data is created to form an image based on the accumulated print data on only one side of the recording paper, the image data is created so that the additional image is formed on the other side of the recording paper, and the electrical apparatus further including, a display section for displaying an image based on display data created by the creating section.

8. The printing system according to claim 7, wherein the printing server transmits information representing an image corresponding to the additional image, when the electrical apparatus transmits the print data to the printing server, the creating section receives the information from the printing server, and creates the display data, and the electrical apparatus is provided with the display section.

9. The printing system according to claim 7, wherein the printing server transmits information representing an image corresponding to the additional image, before the image forming apparatus forms an image based on the image data from the printing server, the creating section receives the information and print data from the printing server, and creates the display data, and the image forming apparatus is provided with the display section.

10. The printing system according to claim 7, wherein the image corresponding to the additional image is different from said additional image.

11. The printing system according to claim 10, wherein the additional image varies with date and time at which an image based on the image data from the printing server is to be formed.

12. The printing system according to claim 10, wherein the printing server is provided with a specifying section for specifying a location at which an apparatus which forms an image based on the print data is provided, and the additional image varies with a location specified by the specifying section.

13. A printing method for obtaining printed matter using a system that includes:

a printing server which receives print data, accumulates the received print data, creates image data representing an image based on the accumulated print data and an additional image to be added to the image, and transmits the created image data; an electrical apparatus which is connected to the printing server so as to communicate with each other, and transmits print data to the printing server; and an image forming apparatus which is connected to the printing server so as to communicate with each other, receives image data from the printing server, and forms an image based on the received image data, the method comprising:

in the printing server, a determining step of determining whether or not a print data to be accumulated is created to form an image based on said print data to be accumulated on only one side of a recording paper;

a creating step of display data for displaying that the additional image is formed on the other side of the recording paper so as to display an image corresponding to the additional image together with an image based on the print data to be accumulated on the electrical apparatus, when it is determined that said print data to be accumulated is created to form an image on only one side of the recording paper in the determining step; and a transmitting step of transmitting display data created in the creating step to the electrical apparatus;

a receiving step of receiving information showing whether or not a print data to be received can be accumulated from the electrical apparatus;

wherein when information showing that the print data to be received can be accumulated is received in the receiving step, said print data to be received is accumulated, a determining step of determining whether or not the accumulated print data is created to form an image based on the accumulated print data on only one side of the recording paper; and when the determining step determines that the accumulated print data is created to form an image based on the accumulated print data on only one side of the recording paper, the printing server creates image data so that the additional image is formed on the other side of the recording paper, and in the electrical apparatus, a displaying step of displaying an image based on the created display data.

14. The printing method according to claim 13, wherein the image corresponding to the additional image is different from said additional image.

15. The printing method according to claim 14, wherein the additional image varies with date and time at which an image based on the image data from the printing server is to be formed.

16. The printing method according to claim 14, wherein said printing server specifies a location at which an apparatus which forms an image based on the print data from the printing server is provided, and the additional image varies with the specified location.

* * * * *